Oct. 31, 1939.  W. O. HEBLER  2,178,343
SAFETY SIGNALING DEVICE FOR AUTOMOBILES
Filed Nov. 2, 1937
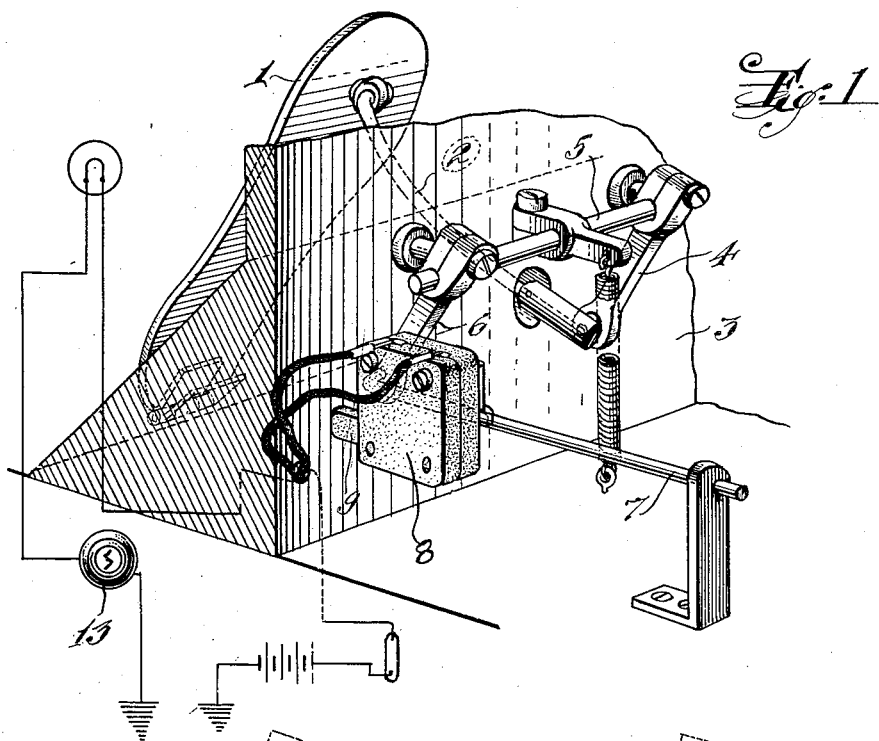
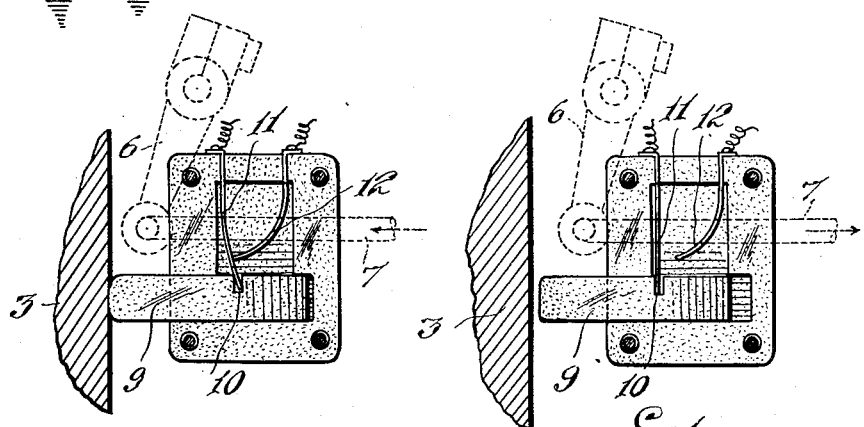
INVENTOR
William O. Hebler,
BY
Frank O. Fischer
ATTORNEY Patented Oct. 31, 1939

2,178,343

UNITED STATES PATENT OFFICE 2,178,343

SAFETY SIGNALING DEVICE FOR AUTOMOBILES

William O. Hebler, Westfield, N. J.

Application November 2, 1937, Serial No. 172,319

1 Claim. (Cl. 200—59)

My invention relates to safety signaling devices for automobiles; and more particularly to a device which can be incorporated as a safety accessory on vehicles propelled by internal combustion engines. Increased speed of vehicles and the resultant increased efficiency of brakes compels the use of more up-to-date and reliable rear light signaling devices.

At present, signals by means of a "stop" light, are given to the driver following a vehicle, said signal being transmitted by a switch working in harmony with a foot brake pedal.

Other signal light arrangements have appeared from time to time whereby a "slow down" signal light appears on deceleration of an engine and goes out the instant the foot brake is applied. These lighting and signaling arrangements are complicated and they are not fool-proof in that their operation is dependent on each other. If, for instance, the filament of the "slow down" signal burns out, then the complete circuit cannot be established when the foot brake light or "stop" light is applied, thereby rendering the complete lighting system useless or inoperable. The same holds true if, for some reason, the foot brake light is not contacting properly; the circuit cannot be established through the "slow-down" signal light.

My aim is to provide a simple contact switch adjustably mounted on an accelerator rod, the contacts in said switch always being normally open. The contacts can be closed only when pressure is applied against the contacts by means of a pusher rod or similar toggle device. The instant this toggle device comes into contact with a "stop" and the instant the accelerator pedal pressure is released, the contacts are closed.

This device can be simply and easily installed on any existing motor vehicle accelerator rod and simply by means of two wires connected into the existing lighting circuit so that the present lighting equipment can be used as a signaling device. To more fully appreciate the value of this signaling device, consider, for example, a car traveling at the rate of fifty miles per hour which suddenly receives an impulse from the driver to stop by means of application of the braking system. If a car is following in the rear, the driver of this car has his foot on the accelerator. The amount of time lag between the time the operator of the first car applies the brake and the time the operator of the second car receives this signal is usually too long. If, on the other hand, the driver of the second car would receive a warning signal the instant the driver of the first car releases the accelerator pedal pressure, he could without difficulty apply his foot brakes or other braking means at almost the same instant that the driver of the first car accomplishes this action.

Simplicity is the key-note of the entire invention, viz., ease of installation, utilization of present wiring on the automotive vehicle, no necessity of added equipment other than the switch mechanism; and above all, contacts which are normally open to close, which provides a safety factor from an electrical contacting stand-point which is far more efficient than any system utilizing a circuit whereby contacts are normally closed to open and dependent upon an auxiliary contacting circuit.

It is the object of my invention to provide a switch which can be easily mounted on an accelerator pedal rod, utilizing preferably the floor board of the automotive vehicle or any other existing "stop" to actuate said switch the instant accelerator pedal pressure is released.

It is a further object of the invention to combine the wiring of said switch, having normally open contacts, with an accelerator pedal, through an ignition switch, on to the battery and lights used for giving the warning signal.

It is a further object of the invention to provide a signaling device for an automobile which is controlled solely by the action of the accelerator, that is, immediately upon the removal of the foot from the accelerator pedal the signal is placed in operation.

A further object is the provision of a stop signaling device for an automobile which includes electrical contact members mounted on the accelerator rod of the automobile so that certain movements of the accelerator rod will cause closing of the contacts and actuation of a signal.

These and other advantageous objects, which will later appear, are accomplished by the simple and practical construction and arrangements of parts, hereinafter described and exhibited in the accompanying drawing, forming part hereof, and in which:

Fig. 1 is a perspective view of the device, showing the device secured to the accelerator rod of an automobile, and, Figs. 2 and 3 are respectively, side elevational views of the device with the cover removed, showing the contact members in Fig. 2 in engagement with each other, and showing the contact members in Fig. 3 normally open or held from engagement with each other.

Referring to the drawing, in Fig. 1 is shown an accelerator pedal which is attached to a link 2 passing through the board 3 of an automobile. The link 2 is connected to an arm 4 fixed to a shaft 5, which has also fixed thereto a downwardly extending arm 6, pivotally connected to an accelerator rod 7. The above structure is more or less conventional in accelerators commonly used on automobiles.

Secured to the accelerator rod by bolts and nuts is a casing formed from two blocks of insulating material 8, which are provided with grooves near the bottom thereof through which slides a plunger 9, the latter being provided with a notch 10 in which rests the end of a leaf spring contact member 11 adapted to engage an arcuate spring contact member 12, to make electrical circuit through a stop light 13. The contact members 11 and 12 are normally held from engagement by the action of spring 11 as shown in Fig. 3. This action takes place when the pedal 1 is depressed to move the accelerator rod 7 forwardly.

In operation, when pressure is relieved from the accelerator pedal, the accelerator rod 7 will be retracted which causes plunger 9 to engage the board 3. This action moves the plunger forwardly to cause engagement of the contact members 11 and 12 as shown in Fig. 2, which closes an electrical circuit through the stop light 13 to indicate immediately to a following automobile that deceleration is taking place. The contact members 11 and 12 are connected in the electrical circuit through the stop lights to ground and through the battery to ground, as shown in Fig. 1.

The spring contact members 11 and 12, each have one end thereof tightly fitted in slots in the block 8, the contact being made between the free ends of the members 11 and 12. The block 8 is made of an insulating material such as hard rubber, or a phenol condensate product, etc.

One of the contact members is connected to the ignition switch of the automobile, and the other contact member is connected to the stop light 13. Whenever the ignition switch is closed and the accelerator pedal is in the raised position the stop light will be actuated. This serves as means also to indicate when the ignition switch has been left on even when the automobile is standing still.

From the above description it will be seen that there has been provided a simple device which can be readily attached to the accelerator rod of an automobile for indicating immediately deceleration of the automobile, so that drivers of vehicles behind the automobile will be informed in sufficient time to regulate the speeds of their vehicles. By means of this device a great number of rear end collisions and serious accidents will be prevented.

The device is of simple structure as is shown by the drawing, and can be conveniently and readily marketed as an accessory, requiring no material alteration of the automobile for installation.

The foregoing disclosure is to be regarded as descriptive and illustrative only, and not as restrictive or limitative of the invention, of which, obviously, embodiments may be constructed including many modifications, without departing from the spirit and scope of the invention herein denoted and set forth in the appended claim.

Having thus described my invention, what I claim as new and desire to secure by Letters Patent, is:

In combination with the accelerator of an automobile having a floor board, said accelerator having a foot pedal on the floor board, and an accelerator rod adapted to be moved longitudinally by the pedal, a casing formed from two blocks of insulating material clamped about the accelerator rod and having a groove, a pair of resilient contact members mounted in the casing, said contact members being normally held from engagement, a plunger slidable in said groove and adapted to engage one of said contact members to move it into engagement with the other contact member when the accelerator rod is retracted and the plunger engages the floor board.

WILLIAM O. HEBLER.